United States Patent
Frazier et al.

(10) Patent No.: US 8,230,679 B2
(45) Date of Patent: Jul. 31, 2012

(54) INCREASING EXHAUST TEMPERATURE FOR AFTERTREATMENT OPERATION

(75) Inventors: Timothy R. Frazier, Columbus, IN (US); Todd Sheridan, Fortville, IN (US)

(73) Assignee: Cummins Inc., Columbus, IN (US)

( * ) Notice: Subject to any disclaimer, the term of this patent is extended or adjusted under 35 U.S.C. 154(b) by 478 days.

(21) Appl. No.: 12/454,930

(22) Filed: May 26, 2009

(65) Prior Publication Data

US 2010/0024391 A1 Feb. 4, 2010

Related U.S. Application Data

(63) Continuation of application No. 12/290,121, filed on Oct. 27, 2008, now abandoned.

(60) Provisional application No. 61/000,488, filed on Oct. 26, 2007.

(51) Int. Cl.
*F01N 3/00* (2006.01)

(52) U.S. Cl. ........... 60/295; 60/274; 60/284; 60/286; 60/297; 60/300; 180/65.1; 180/65.26; 180/309

(58) Field of Classification Search ........... 60/274, 60/284, 285, 286, 295, 297, 300, 311, 280; 180/65.1, 65.21, 65.26, 309
See application file for complete search history.

(56) References Cited

U.S. PATENT DOCUMENTS

| 1,365,125 | A | 1/1921 | Schroeder, Jr. | |
|---|---|---|---|---|
| 5,079,921 | A | 1/1992 | McCandless et al. | |
| 5,983,630 | A | * | 11/1999 | Kibe et al. ............... 60/285 |
| 6,304,815 | B1 | 10/2001 | Moraal et al. | |
| 6,327,852 | B1 | * | 12/2001 | Hirose ............... 60/297 |
| 6,330,873 | B1 | 12/2001 | Letang et al. | |
| 6,536,209 | B2 | * | 3/2003 | Fluga et al. ............... 60/284 |
| 6,594,990 | B2 | 7/2003 | Kuenstler et al. | |
| 6,672,050 | B2 | * | 1/2004 | Murata et al. ............... 60/284 |
| 6,766,874 | B2 | * | 7/2004 | Naito et al. ............ 180/65.26 |
| 7,007,460 | B2 | * | 3/2006 | Frieden et al. ............... 60/284 |
| 7,775,037 | B2 | * | 8/2010 | Ishibashi ............... 60/287 |

FOREIGN PATENT DOCUMENTS

EP 1 365 125 A1 11/2003

* cited by examiner

*Primary Examiner* — Binh Q Tran
(74) *Attorney, Agent, or Firm* — Matthew Fair; Krieg DeVault LLP

(57) ABSTRACT

An internal combustion engine system includes: an engine with a plurality of pistons; a variable load driven by rotary power from the engine, the load including one or more of a pump, an air conditioner; and a fan; aftertreatment equipment to control exhaust emission from the engine; a sensor to provide a sensor signal corresponding to temperature of exhaust from the engine; and a controller coupled to the sensor and operable to regulate a regeneration operation of one or more components of the aftertreatment equipment. The controller responds to the sensor signal to generate one or more control signals to adjust the variable load to increase loading of the engine and correspondingly raise the temperature of the exhaust for the regeneration operation.

19 Claims, 3 Drawing Sheets

INCREASING EXHAUST TEMPERATURE FOR AFTERTREATMENT OPERATION

CROSS-REFERENCE TO RELATED APPLICATIONS

The present application is a continuation of U.S. patent application Ser. No. 12/290,121 filed Oct. 27, 2008 now abandoned, which claims the benefit of U.S. Provisional Patent Application No. 61/000,488 filed 26 Oct. 2007, both of which are hereby each incorporated by reference in its entirety.

BACKGROUND

The present invention relates to operation of an engine with aftertreatment, and more particularly, but not exclusively relates to increasing exhaust temperature for aftertreatment during engine operation with a low load.

Various aftertreatment subsystems have been developed to control exhaust emissions from internal combustion engines. The performance of aftertreatment subsystems often varies with temperature, which has led to the development of various thermal management schemes. Unfortunately, these schemes often fall short of performance goals when the engine operates with a relatively light load because desired temperature levels are difficult to reliably attain. Thus, there is a continuing demand for further contributions in this area of technology.

SUMMARY

One embodiment of the present invention includes a unique technique to regulate operation of an internal combustion engine. Other embodiments include unique apparatus, devices, systems, and methods involving the control of an internal combustion engine with temperature-dependent aftertreatment. Further embodiments, forms, objects, features, advantages, aspects, and benefits of the present application shall become apparent from the detailed description and drawings included herein.

DETAILED DESCRIPTION OF REPRESENTATIVE EMBODIMENTS

Figure 1:
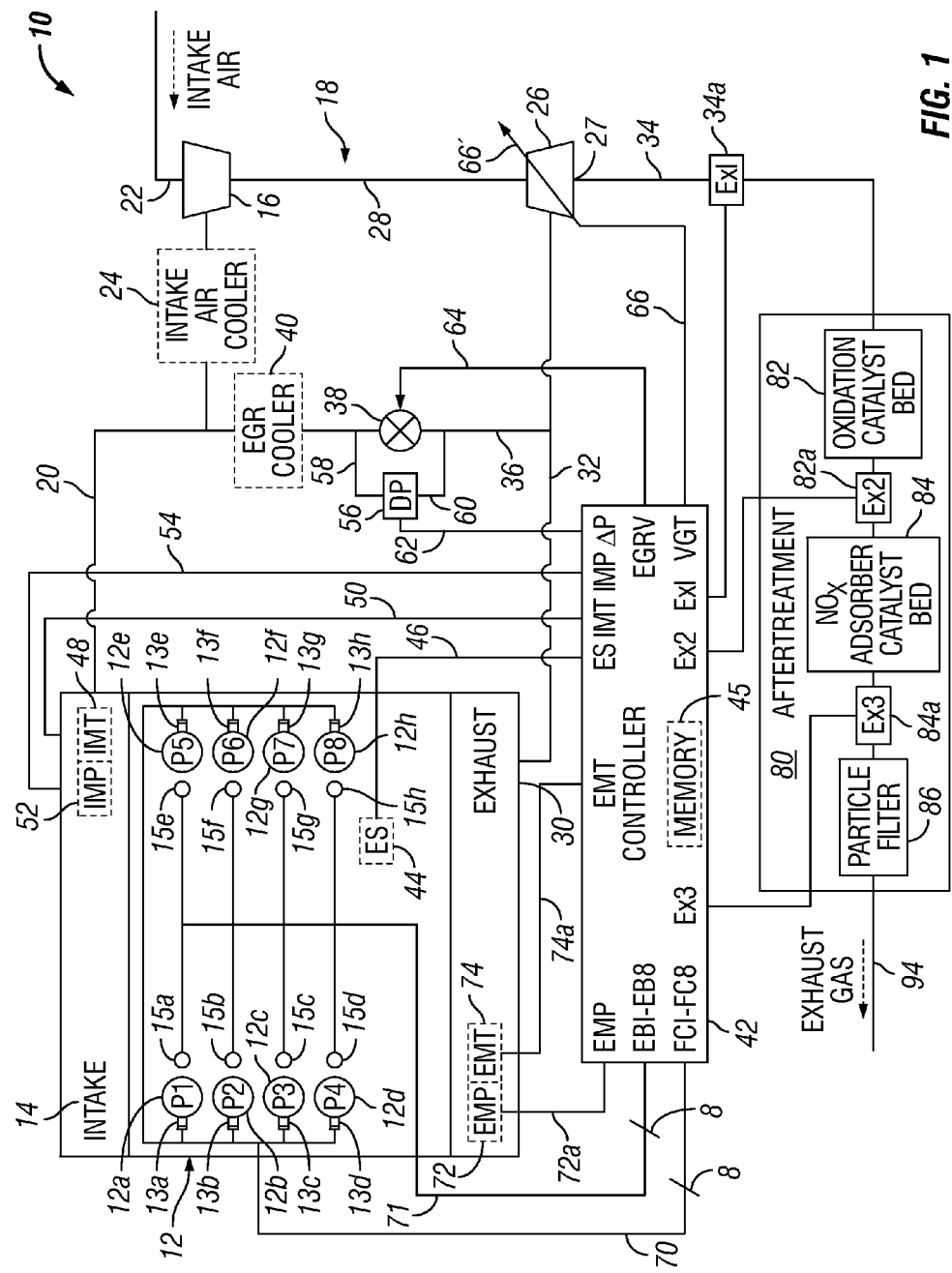
FIG. 1 is a diagrammatic view of an internal combustion engine system including aftertreatment equipment.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

FIG. 1 shows an engine system 10 of another embodiment of the present invention. System 10 includes an internal combustion engine 12 having an intake manifold 14 fluidly coupled to an outlet of a compressor 16 of a turbocharger 18 via an intake conduit 20. Compressor 16 includes a compressor inlet coupled to an intake conduit 22 for receiving fresh air therefrom. Optionally, as shown in phantom in FIG. 1, system 10 may include an intake air cooler 24 of known construction disposed in line with intake conduit 20 between compressor 16 and intake manifold 14. The turbocharger compressor 16 is mechanically coupled to a turbocharger turbine 26 via a drive shaft 28. Turbine 26 includes a turbine inlet fluidly coupled to an exhaust manifold 30 of engine 12 via an exhaust conduit 32. Collectively, conduit 20, intake manifold 14, engine 12, exhaust manifold 30, and conduit 32 define a pathway 33 along which gas flows from compressor 16 to turbine 26 during nominal operation of engine 12. Engine 12 can be of any type.

For the depicted embodiment, engine 12 is of a reciprocating piston type with four stroke operation, and runs on diesel fuel received by direct or port injection with compression ignition. More specifically, as schematically represented in FIG. 1, engine 12 includes eight pistons P1-P8 that are disposed in cylinders 12a-12h, respectively. Pistons P1-P8 are each connected to a crankshaft by a corresponding connecting rod (not shown) to reciprocally move within the respective cylinder 12a-12h in a standard manner for four stroke engine operation. Each cylinder 12a-12h includes a combustion chamber with appropriate intake and exhaust valves (not shown) and fuel injectors 13a-13h, respectively. Fuel injectors 13a-13h are of a standard type that operate in response to signals from electronic controls described in greater detail hereinafter. Fuel injectors 13a-13h receive fuel from a fuel source (not shown) in fluid communication therewith. Engine 12 further includes an engine brake subsystem that is individually controllable for each cylinder 12a-12h as designated by engine brake actuators 15a-15h, respectively. In one form, engine brake actuators 15a-15h each hold open a respective exhaust valve when activated, which more particularly provides an exhaust brake mode of operation, such that air is pumped in and out of the respective cylinder 12a-12h through the open valve. Alternatively or additionally, in other embodiments, engine 12 may operate with a different type of fuel, may be of a carburetor type, may have a different ignition approach, and/or otherwise differ as would occur to those skilled in the art.

An EGR valve 38 is disposed in-line with an EGR conduit 36 fluidly coupled at one end to intake conduit 20 and at an opposite end to exhaust conduit 32. An EGR cooler 40 of known construction may optionally be disposed in-line with EGR conduit 36 between EGR valve 38 and intake conduit 20 as shown in phantom in FIG. 1.

System 10 includes a controller 42 that is generally operable to control and manage operational aspects of engine 12. Controller 42 includes memory 45 as well as a number of inputs and outputs for interfacing with various sensors and systems coupled to engine 12. Controller 42 can be an electronic circuit comprised of one or more components, including digital circuitry, analog circuitry, or both. Controller 42 may be a software and/or firmware programmable type; a hardwired, dedicated state machine; or a combination of these. In one embodiment, controller 42 is of a programmable microcontroller solid-state integrated circuit type that includes memory 45 and one or more central processing units. Memory 45 can be comprised of one or more components and can be of any volatile or nonvolatile type, including the solid-state variety, the optical media variety, the magnetic variety, a combination of these, or such different arrangement as would occur to those skilled in the art. Controller 42 can include signal conditioners, signal format converters (such as analogto-digital and digital-to-analog converters), limiters, clamps, filters, and the like as needed to perform various control and regulation operations described herein. Controller 42, in one embodiment, may be a standard type sometimes referred to as an electronic or engine control module (ECM), electronic or engine control unit (ECU) or the like, that is directed to the regulation and control of overall engine operation. Alternatively, controller 42 may be dedicated to control of just the operations described herein or to a subset of controlled aspects of engine 12. In any case, controller 42 preferably includes one or more control algorithms defined by operating logic in the form of software instructions, hardware instructions, dedicated hardware, or the like. These algorithms will be described in greater detail hereinafter, for controlling operation of various aspects of system 10.

Controller 42 includes a number of inputs for receiving signals from various sensors or sensing systems associated with system 10. For example, system 10 includes an engine speed sensor 44 electrically connected to an engine speed input, ES, of controller 42 via signal path 46. Engine speed sensor 44 is operable to sense rotational speed of the engine 12 and produce an engine speed signal on signal path 46 indicative of engine rotational speed. In one embodiment, sensor 44 is a Hall effect sensor operable to determine engine speed by sensing passage thereby of a number of equi-angularly spaced teeth formed on a gear or tone wheel. Alternatively, engine speed sensor 44 may be any other known sensor operable as just described including, but not limited to, a variable reluctance sensor or the like.

System 10 further includes an intake manifold temperature sensor 48 disposed in fluid communication with the intake manifold 14 of engine 12, and electrically connected to an intake manifold temperature input (IMT) of controller 42 via signal path 50. Intake manifold temperature sensor 48 may be of known construction, and is operable to produce a temperature signal on signal path 50 indicative of the temperature of air charge flowing into the intake manifold 14, wherein the air charge flowing into the intake manifold 14 is generally made up of fresh air supplied by the turbocharger compressor 16 combined with recirculated exhaust gas supplied by EGR valve 38.

System 10 further includes an intake manifold pressure sensor 52 disposed in fluid communication with intake manifold 14 and electrically connected to an intake manifold pressure input (IMP) of controller 42 via signal path 54. Alternatively, pressure sensor 52 may be disposed in fluid communication with intake conduit 20. In any case, pressure sensor 52 may be of known construction, and is operable to produce a pressure signal on signal path 54 indicative of air pressure within intake conduit 20 and intake manifold 14.

System 10 also includes an exhaust manifold pressure sensor 72 disposed in fluid communication with exhaust manifold 30 and electrically connected to an exhaust manifold pressure input (EMP) of controller 42 via signal path 72a. Alternatively, pressure sensor 72 may be disposed in the fluid communication with exhaust conduit 32. In any case, pressure sensor 72 may be of known construction and is operable to produce pressure signal on signal path 72a indicative of gas pressure within exhaust conduit 32 and exhaust manifold 30.

System 10 further includes a differential pressure sensor, or DP sensor, 56 fluidly coupled at one end to EGR conduit 36 adjacent to an exhaust gas inlet of EGR valve 38 via conduit 60, and fluidly coupled at its opposite end to EGR conduit 36 adjacent to an exhaust gas outlet of EGR valve 38 via conduit 58. Alternatively, DP sensor 56 may be coupled across another flow restriction mechanism disposed in-line with EGR conduit 36. In either case, the DP sensor 56 may be of known construction and is electrically connected to a DP input of controller 42 via signal path 62. DP sensor 62 is operable to provide a differential pressure signal on signal path 62 indicative of the pressure differential across EGR valve 38 or other flow restriction mechanism disposed in-line with EGR conduit 36. Nonetheless, it should be recognized that in other embodiments EGR valve 38, DP sensor 56, and associated conduits, coolers, and the like, may be absent.

Controller 42 also includes a number of outputs for controlling one or more engine functions associated with system 10. For example, EGR valve 38 is electrically connected to an EGR valve output (EGRV) of controller 42 via signal path 64. Controller 42 is operable, as is known in the art, to produce an EGR valve control signal on signal path 64 to correspondingly control the position of EGR valve 38 relative to a reference position in a known manner. Controller 42 is accordingly operable to control EGR valve 38 to selectively provide a flow of recirculated exhaust gas from exhaust manifold 30 to intake manifold 14. Accordingly, while composition of gas flowing along pathway 33 changes from: (a) compressed air, (b) to an air/fuel charge, and then (c) to exhaust—when EGR valve 38 is closed—such composition may also include various amounts of recirculated exhaust gas when EGR valve 38 is open.

Controller 42 also includes at least one output, VGT, for controlling operation of a variable geometry turbine (VGT) mechanism 66' that is included in turbocharger 18. VGT mechanism 66' is schematically illustrated in FIG. 1 and is operatively connected to the VGT output via signal path 66. Controller 42 is operable to produce a variable geometry turbocharger control signal on signal path 66 to control the swallowing capacity (i.e., exhaust gas flow capacity) of turbine 26 by controlling the flow geometry of turbine 26 in a standard manner.

Another control mechanism that optionally may be included within system 10 is an electronically controllable wastegate valve (not shown) having a wastegate valve actuator (not shown) electrically connected to controller 42. The wastegate valve has an inlet fluidly coupled to exhaust conduit 32, and an outlet fluidly coupled to exhaust conduit 34. Controller 42 is operable to produce a wastegate valve control signal to control the position of the wastegate valve relative to a reference position. The position of the wastegate valve defines a cross-sectional flow area therethrough, and by controlling the cross-sectional flow area of the wastegate valve, controller 42 is operable to selectively divert exhaust gas away from turbine 26, and thereby control the swallowing efficiency of turbine 26.

Controller includes a separate output FC1 through FC-8 (also collectively designed fuel command outputs FC) to control operation of each fuel injector 13a-13h, respectively. The signal paths for outputs FC are also collectively designated by reference numeral 70 in FIG. 1; however, it should be understood that the timing of fuel injected by each injector 13a-13h can be independently controlled for each piston P1-P8 with controller 42. In addition to the timing of fuel injection, controller 42 can also regulate the amount of fuel injected. Typically, fuel amount varies with the number and duration of injector-activating pulses provided to injectors 13a-13h. Furthermore, controller 42 can direct the withholding of fuel from one or more cylinders 12a-12h (and pistons P1-P8) for a desired period of time.

Such withholding of fuel is typically performed in coordination with activation of each corresponding engine brake actuator 15a-15h. Controller 42 includes separate outputs EB1-EB8 (also collectively designated engine brake command outputs EB) to respectively activate and deactivate engine brake actuators 15a-15h. The signal paths for outputs EB are also collectively designated by reference numeral 71 in FIG. 1; however, it should be understood that the timing and activation of actuators 15a-15h can be independently controlled for each piston P1-P8 with controller 42. In one alternative embodiment, engine brake actuators 15a-15h are actuatable in sets each numbering more than one. In still another embodiment, actuators 15a-15h or some subset thereof can be manually activated in response to an operator input, such as may be desired during downhill travel for a heavy duty application. In still other embodiments, such alternatives are not available. Accordingly, while withholding fuel from a portion of cylinders 12a-12h, an engine braking mode of operation can be realized for such cylinders 12a-12h, while one or more other cylinders 12a-12h continue to operate in a combustion mode. In yet other alternatives, fueling may selectively take place at some level for at least a portion of the cylinders 12a-12h during engine brake operation to provide a rich mixture to enhance certain aftertreatment operations or the like.

System 10 also includes aftertreatment equipment 80 to provide for aftertreatment of exhaust gases before discharge through a conduit 94. During engine operation, exhaust gas flows from turbine outlet 27 through exhaust conduit 34 in fluid communication therewith. Conduit 34 is also in fluid communication with aftertreatment equipment 80, which receives the exhaust gas from turbine 26 for aftertreatment. Aftertreatment equipment 80 can include a number of devices to chemically convert and/or remove undesirable constituents from the exhaust stream before discharge into the environment. Specifically, aftertreatment equipment 80 includes an oxidation catalyst bed 82 directed to the conversion of NO to $NO_2$, the selective generation of molecular hydrogen ($H_2$) and/or CO for regeneration, and the like; adsorber catalyst bed 84 directed to the selective trapping of nitrogen oxide and/or sulfur oxide compounds; and a particulate filter 86 directed to the capture of particulate matter contained in the exhaust stream, including soot and the like. For nominal operation the temperature of at least some portions of aftertreatment equipment 80 needs to meet or exceed a selected threshold temperature. Also, for certain regeneration modes, even higher temperatures need to be reached from time-to-time. These regeneration modes can include "recharging" the adsorber catalyst bed 84 by providing a rich fuel mixture with a higher temperature compared to nominal aftertreatment operation to release trapped nitrogen oxides as molecular nitrogen ($N_2$), water vapor, or the like; a less frequent sulfur oxide purge of bed 82 at high temperature; and a particle burn-off for particulate filter 86 at elevated temperature. In other embodiments, aftertreatment equipment 80 may include more, fewer, or different stages. For example, in one alternative embodiment, beds 82 and/or 84 are not present, including only filter 86. In still other embodiments, a different aftertreatment arrangement can be utilized and/or may be absent altogether.

Controller 42 includes a number of inputs for receiving signals from various exhaust temperature sensors associated with system 10. For example, system 10 includes an exhaust temperature sensor 34a disposed in fluid communication with exhaust conduit 34 and connected to a temperature input Ex1. Exhaust temperature sensor 34a is operable to sense the temperature of the exhaust as it enters aftertreatment equipment 80. System 10 further includes an exhaust temperature sensor 82a disposed in fluid communication with aftertreatment equipment 80, and electrically connected to temperature input Ex2 of controller 42. Exhaust temperature sensor 82a is operable to produce a temperature signal indicative of the temperature of exhaust flowing out of the oxidation catalyst bed 82. System 10 further includes an exhaust temperature sensor 84a disposed in fluid communication with aftertreatment equipment 80, and electrically connected to temperature input Ex3 of controller 42. Exhaust temperature sensor 84a is operable to produce a temperature signal indicative of the temperature of exhaust flowing out of the absorber catalyst bed 84. Sensors 34a, 82a, and 84a can be of any standard type.

For a nominal combustion mode of operation of cylinders 12a-12h, controller 42 determines an appropriate amount of fueling as a function of the engine speed signal ES from engine speed sensor 44 as well as a one or more other parameters; and generating corresponding fueling command output signals FC, with appropriate timing relative to ignition, using techniques known to those skilled in the art. Controller 42 also executes logic to regulate various other aspects of engine operation based on the various sensor inputs available, and to generate corresponding control signals with outputs FC, EGRV, VGT, or one or more others (not shown). Furthermore, in some applications it is desirable to control one or more aspects of the operation of system 10 based on a temperature of the exhaust output by engine 12 and/or turbine 26.

Figure 2:
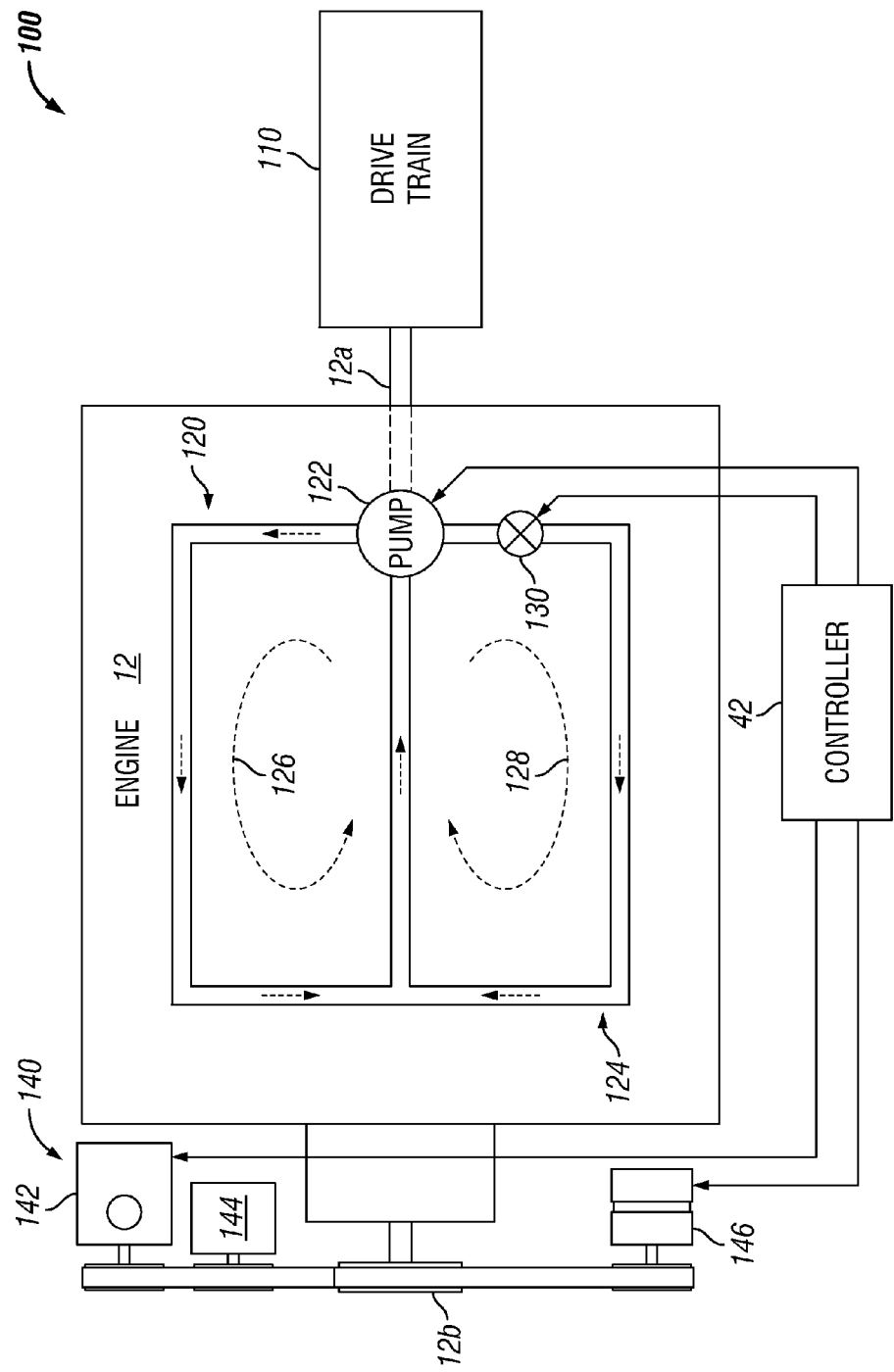
FIG. 2 is a further diagrammatic view of the system of FIG. 1 depicting several further features.

System 10 also includes a parasitic loading subsystem 100, which is shown in FIG. 2. Subsystem 100 includes auxiliary variable loads 140 rotationally coupled to engine by auxiliary shaft 12b. Typically, loads 140 has a standard primary purpose. In addition, it has been discovered that they can be used to variably load engine 12 for various auxiliary purposes, as well. Variable loads 140 include air conditioner/cooling fluid compressor 142 of a standard type, that is directly or indirectly controlled by controller 42. Variable loads 140 further include variable fan 144 of standard type, that is directly or indirectly controlled by controller 42. Variable loads 140 further include a power steering pump 146 of standard type, that is directly or indirectly controlled by controller 42.

Subsystem 100 also includes an oil circulation subsystem 120. Subsystem 120 includes oil pump 122 of standard type and variable oil flow circuitry 124 controlled by controller 42. Circuitry 124 includes primary oil flow circuit 126 and parasitic oil flow circuit 128. Typically, pump 122 is powered directly or indirectly by engine 12 via linkage 12a. Linkage 12a is also directly or indirectly connected to drive train 110. Oil pump 122 lubricates engine components by pumping oil through the primary oil flow circuit 126. In addition, controllable valve 130 can be activated by controller 42 to cause pump 122 to pump oil through the parasitic oil flow circuit 128 to increase loading on engine 12. When oil flow through circuit 128 is selected, it may also provide a lubrication/heat exchange function that supports the objective of increasing exhaust temperature as is more fully described hereinafter. Valve 130 is selectively activated by a corresponding output signal from controller 42. Likewise, controller 42 can control operation of pump 122.

Figure 3:
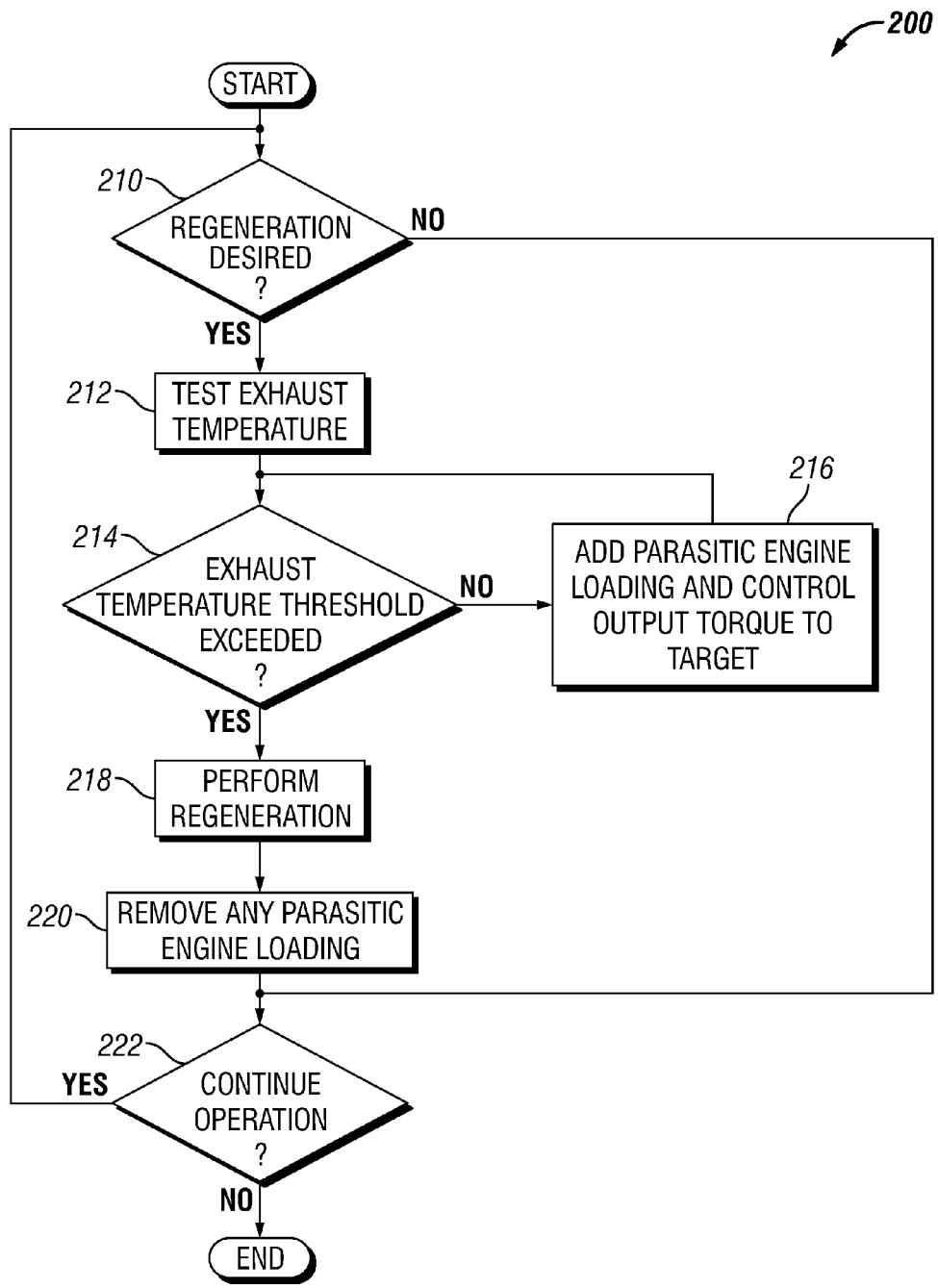
FIG. 3 is a flowchart corresponding to a procedure for regenerating the aftertreatment equipment of FIG. 1.

FIG. 3 illustrates exhaust temperature control procedure 200 in flowchart form, which can be implemented with system 10 using appropriate operating logic executed by controller 42. Procedure 200 is directed to elevating exhaust temperature to a level desired to operate aftertreatment equipment 80 when engine 12 is under a low load condition. Procedure 200 begins with conditional 210. Conditional 210 tests whether regeneration is desired. If the test of conditional 210 is negative (NO), then procedure 200 continues with conditional 222. Conditional 222 tests whether to continue procedure 200 or to halt procedure 200. If the test of conditional 222 is negative (NO), then procedure 200 stops. If the test of conditional 222 is positive (YES), then procedure 200 returns to repeat conditional 210. If the test of conditional 210 is positive (YES), then operation 212 is performed. Operation 212 is directed to read the exhaust temperature as indicated by exhaust temperature sensor 34*a*. However, in other embodiments, exhaust temperature alternatively or additionally may be determined from sensor 82*a* and/or 84*a*.

After execution of operation 212, procedure 200 continues with conditional 214. Conditional 214 tests whether the exhaust temperature is at a minimum level desired to perform regeneration. This threshold value may vary with performance conditions of aftertreatment equipment 80 and/or engine 12. This temperature level can be difficult to reach when engine 12 is lightly loaded, such as is the usual case when idling. If the test of conditional 214 is negative (NO), then operation 216 is performed. Operation 216 is directed to increasing the temperature of exhaust produced by engine 12 by adding parasitic loading to the engine. As a result of adding parasitic loading to the engine, the pistons P1-P8 operate with more fuel, generating more heat, and commensurately raising the exhaust temperature. This parasitic loading can involve operating one or more of the variable auxiliary loads 140. Moreover, operation 216 can include opening valve 130 to cause oil flow through the parasitic oil flow circuit 128. After execution of operation 216, procedure 120 returns to conditional 214, which as previously described, tests whether the exhaust temperature is at a minimum level desired to perform regeneration. If the test of conditional 214 is positive (YES), then procedure 200 continues with operation 218.

In operation 218, regeneration of aftertreatment equipment 80 is performed. After execution of operation 218, procedure 200 continues with operation 220. Operation 220 is directed to the removal of all parasitic engine loading added in connection with operation 216. After execution of operation 220, procedure 200 continues with conditional 222, which as previously described, tests whether to continue procedure 200 or halt procedure 200.

Many other embodiments of the present invention are also envisioned. For example, in other embodiments, one or more additional forms of engine loading are used to augment the dynamic adjustment of engine load through exhaust braking. In another example, temperature associated with desired operation of aftertreatment equipment is additionally or alternatively raised through the catalytic oxidation of a rich fuel mixture supplied to such equipment or using a different technique as would occur to those skilled in the art. In still other examples, elevation of exhaust temperature is performed in accordance with the present application for a reason other than aftertreatment, and indeed, aftertreatment equipment may or may not be included in such applications.

Another example comprises: operating an internal combustion engine system including an engine with a plurality of pistons, an oil circulation subsystem including a pump driven by the engine and variable oil flow circuitry, and aftertreatment equipment to control exhaust emission from the engine; increasing load on the engine by adjusting the variable oil flow circuitry to a first state that increases work performed by the pump; permitting temperature of an exhaust stream from the engine to increase in response to the increasing of the load on the engine; performing a regeneration of one or more components of the aftertreatment equipment while the temperature of the exhaust stream exceeds a threshold; and changing the variable oil flow circuitry from the first state to a second state to reduce the load on the engine and permit the temperature of the exhaust stream to decrease below the threshold after the regeneration.

In still another example, an internal combustion engine system includes an engine with a plurality of pistons, an oil circulation subsystem including a pump driven by the engine and variable oil flow circuitry, and aftertreatment equipment to control exhaust emission from the engine. Also included are means for increasing load on the engine by adjusting the variable oil flow circuitry to a first state that increases work performed by the pump, means for permitting temperature of an exhaust stream from the engine to increase in response to the increasing of the load on the engine, means for performing a regeneration of one or more components of the aftertreatment equipment while the temperature of the exhaust stream exceeds a threshold, and means for changing the variable oil flow circuitry from the first state to a second state to reduce the load on the engine and permit the temperature of the exhaust stream to decrease below the threshold after the regeneration.

A further example includes: operating an internal combustion engine system including an engine with a plurality of pistons, aftertreatment equipment to control exhaust emission from the engine, a variable load rotationally coupled to the engine to receive power therefrom, the load including one or more of a pump, an air conditioner, and a fan; increasing loading of the engine by changing the variable load to a first state to increase temperature of an exhaust stream from the engine; performing a regeneration of one or more components of the aftertreatment equipment as the temperature of the exhaust stream exceeds a threshold with the load in the first state; and adjusting the variable load from the first state to a second state to reduce the loading of the engine and permit the temperature of the exhaust stream to decrease below the threshold after the regeneration.

Yet a further example comprises: an internal combustion engine system including an engine with a plurality of pistons, aftertreatment equipment to control exhaust emission from the engine, a variable load rotationally coupled to the engine to receive power therefrom, the load including one or more of a pump, an air conditioner, and a fan. Also included are: means for increasing loading of the engine by changing the variable load to a first state to increase temperature of an exhaust stream from the engine, means for performing a regeneration of one or more components of the aftertreatment equipment as the temperature of the exhaust stream exceeds a threshold with the load in the first state, and means for adjusting the variable load from the first state to a second state to reduce the loading of the engine and permit the temperature of the exhaust stream to decrease below the threshold after the regeneration.

Yet another example is directed to an internal combustion engine system, comprising: an engine with a plurality of pistons; a variable load driven by rotary power from the engine, the load including one or more of a pump, an air conditioner, and a fan; aftertreatment equipment to control exhaust emission from the engine; a sensor to provide a sensor signal corresponding to temperature of exhaust from the engine; and a controller coupled to the sensor and operable to regulate a regeneration operation of one or more components of the aftertreatment equipment, the controller being responsive to the sensor signal to generate one or more control signals to adjust the variable load to increase loading of the engine and correspondingly raise the temperature of the exhaust for the regeneration operation, the variable load being responsive to one or more other control signals to reduce the load on the engine and permit the temperature of the exhaust stream to decrease after the regeneration operation.

Still another example is directed to an internal combustion engine system, comprising: an engine with a plurality of pistons; an oil circulation subsystem including a pump driven by the engine and variable oil flow circuitry; aftertreatment equipment to control exhaust emission from the engine; a sensor to provide a sensor signal corresponding to temperature of exhaust from the engine; and a controller coupled to the sensor and operable to regulate a regeneration operation of one or more components of the aftertreatment equipment, the controller being responsive to the sensor signal to generate one or more control signals to adjust the variable oil flow circuitry to a first state that increases work performed by the pump and correspondingly increases loading of the engine to raise the temperature of the exhaust for the regeneration operation, the controller being operation to change the variable flow oil flow circuitry from the first state to a second state to reduce the load on the engine and permit the temperature of the exhaust stream to decrease after the regeneration operation.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising:
   operating an internal combustion engine system including an engine with a plurality of pistons, an oil circulation subsystem including a pump driven by the engine and variable oil flow circuitry, and aftertreatment equipment to control exhaust emission from the engine;
   increasing load on the engine by adjusting the variable oil flow circuitry to a first state that increases work performed by the pump;
   permitting temperature of an exhaust stream from the engine to increase in response to the increasing of the load on the engine;
   performing a regeneration of one or more components of the aftertreatment equipment while the temperature of the exhaust stream exceeds a threshold; and
   changing the variable oil flow circuitry from the first state to a second state to reduce the load on the engine and permit the temperature of the exhaust stream to decrease below the threshold after the regeneration.

2. The method of claim 1, wherein the circuitry includes a first oil flow circuit and a second oil flow circuit and the first state includes pumping oil through both the first oil flow circuit and the second oil flow circuit and the second state includes pumping oil through only one of the first oil flow circuit and the second oil flow circuit.

3. The method of claim 1, which includes:
   providing a torque output from the engine to a drive train; and
   regulating the torque output to remain generally constant when changing the load on the engine by the changing of the variable oil flow circuitry between the first state and the second state.

4. The method of claim 1, wherein the one or more components includes a diesel particulate filter and the performing of the regeneration includes regenerating the diesel particulate filter.

5. The method of claim 1, wherein the increasing the load further includes adding a parasitic load from at least one of a fan, an air conditioner, and another pump, the parasitic load being rotationally coupled to the engine to receive mechanical power therefrom.

6. A method, comprising:
   operating an internal combustion engine system including an engine with a plurality of pistons, aftertreatment equipment to control exhaust emission from the engine, a variable load rotationally coupled to the engine to receive power therefrom, the load including one or more of a pump, an air conditioner, and a fan;
   increasing loading of the engine by changing the variable load to a first state to increase temperature of an exhaust stream from the engine, wherein the increasing of the loading of the engine includes adding another load that comprises pumping oil through an optional oil flow circuit selected to provide a parasitic load;
   performing a regeneration of one or more components of the aftertreatment equipment as the temperature of the exhaust stream exceeds a threshold with the load in the first state; and
   adjusting the variable load from the first state to a second state to reduce the loading of the engine and permit the temperature of the exhaust stream to decrease below the threshold after the regeneration.

7. The method of claim 6, wherein the load includes the air conditioner.

8. The method of claim 6, which includes:
   providing a torque output from the engine to a drive train; and
   regulating the torque output to remain generally constant when changing the load on the engine by the adjusting of the variable load between the first state and the second state.

9. The method of claim 6, wherein the one or more components includes a diesel particulate filter and the performing of the regeneration includes regenerating the diesel particulate filter.

10. The method of claim 6, wherein the load includes the pump.

11. An internal combustion engine system, comprising:
    an engine with a plurality of pistons;
    a variable load driven by rotary power from the engine, the load including a pump, and one or more of an air conditioner and a fan, wherein the pump includes means for pumping oil through variable oil flow circuitry;
    aftertreatment equipment to control exhaust emission from the engine;
    a sensor to provide a sensor signal corresponding to temperature of exhaust from the engine; and
    a controller coupled to the sensor and operable to regulate a regeneration operation of one or more components of the aftertreatment equipment, the controller being responsive to the sensor signal to generate one or more control signals to adjust the variable load to increase loading of the engine and correspondingly raise the temperature of the exhaust for the regeneration operation, the variable load being responsive to one or more other control signals to reduce the load on the engine and permit the temperature of the exhaust stream to decrease after the regeneration operation.

12. The system of claim 11, wherein the load includes the air conditioner.

13. The system of claim 11, wherein the one or more components includes a diesel particulate filter.

14. The system of claim 11, further comprising means for providing torque form the engine to a drive train.

15. An internal combustion engine system, comprising:
an engine with a plurality of pistons;
an oil circulation subsystem including a pump driven by the engine and variable oil flow circuitry;
aftertreatment equipment to control exhaust emission from the engine;
a sensor to provide a sensor signal corresponding to temperature of exhaust from the engine; and
a controller coupled to the sensor and operable to regulate a regeneration operation of one or more components of the aftertreatment equipment, the controller being responsive to the sensor signal to generate one or more control signals to adjust the variable oil flow circuitry to a first state that increases work performed by the pump and correspondingly increases loading of the engine to raise the temperature of the exhaust for the regeneration operation, the controller being operation to change the variable flow oil flow circuitry from the first state to a second state to reduce the load on the engine and permit the temperature of the exhaust stream to decrease after the regeneration operation.

16. The system of claim 15, wherein the circuitry includes a first oil flow circuit and a second oil flow circuit and the first state includes means for pumping oil through both the first oil flow circuit and the second oil flow circuit and the second state includes means for pumping oil through only one of the first oil flow circuit and the second oil flow circuit.

17. The system of claim 15, which includes:
means for providing a torque output from the engine to a drive train; and
means for regulating the torque output to remain generally constant when changing the load on the engine by the changing of the variable oil flow circuitry between the first state and the second state.

18. The system of claim 15, further comprising means for providing a further load to increase the temperature of the exhaust.

19. The system of claim 15, wherein the further load includes at least one of a fan, an air conditioner, a cooling fluid compressor, and another pump.

* * * * *